United States Patent [19]

Zipperian

[11] Patent Number: 5,228,886

[45] Date of Patent: Jul. 20, 1993

[54] MECHANOCHEMICAL POLISHING ABRASIVE

[75] Inventor: Donald C. Zipperian, Tucson, Ariz.

[73] Assignee: Buehler, Ltd., Lake Bluff, Ill.

[21] Appl. No.: 753,654

[22] Filed: Aug. 30, 1991

Related U.S. Application Data

[63] Continuation of Ser. No. 594,065, Oct. 9, 1990, abandoned.

[51] Int. Cl.$^5$ .................................. B24D 3/00
[52] U.S. Cl. ........................... 51/293; 51/308; 51/309
[58] Field of Search .................... 51/293, 308, 309

[56] References Cited

U.S. PATENT DOCUMENTS

| | | | |
|---|---|---|---|
| 3,485,608 | 12/1969 | Cecil | 51/308 |
| 3,922,393 | 11/1975 | Sears, Jr. | 51/308 |
| 4,011,099 | 3/1977 | Gutsche | 51/308 |
| 4,664,679 | 5/1987 | Kohyama et al. | 51/309 |
| 4,889,586 | 12/1989 | Noguchi et al. | 156/654 |
| 4,918,874 | 4/1990 | Tiefenbach, Jr. | 51/309 |
| 5,064,683 | 11/1991 | Poon et al. | 51/281 R |
| 5,084,071 | 1/1992 | Nenadic et al. | 51/307 |

*Primary Examiner*—Mark L. Bell
*Assistant Examiner*—Willie J. Thompson
*Attorney, Agent, or Firm*—Allegretti & Witcoff, Ltd.

[57] ABSTRACT

A mechanochemical polishing abrasive and a process for using the mechanochemical polishing abrasive to polish the surface of a hardened workpiece cheaply and efficiently. The mechanochemical polishing abrasive comprises a slurry of colloidal silica and a mechanical abrasive selected from one or more of the materials in the group comprising $Fe_2O_3$, $Fe_3O_4$, MgO, $BaCO_3$, $CaCO_3$, $MnO_2$, CeO, $SiO_2$, $CeO_2$, $Cr_2O_3$, and $Al_2O_3$.

16 Claims, No Drawings

MECHANOCHEMICAL POLISHING ABRASIVE

This is a continuation of application Ser. No. 07/594,065, filed Oct. 9, 1990, aban. Apr. 16, 1992.

BACKGROUND OF THE INVENTION

1. Field of the Invention

The invention is a mechanochemical polishing abrasive for use in the polishing of hard substrates such as ceramics, crystalline-materials, glass and similar materials which require highly polished surfaces.

The economics of polishing and machining ceramics can often be the most costly part of the ceramic production process. Economic considerations for polishing ceramics involve both the time and the consumable products employed. For final polishing of ceramics, diamond abrasives are extensively used, the diamond abrasives are expensive and the polishing process using diamond abrasives is slow.

Conversely, the machining of ceramics can be very damaging. Unlike the machining of metals which are ductile, ceramics are generally very brittle. The brittle nature of ceramics makes them very sensitive to subsurface fracturing. This subsurface damage adversely affects significant physical properties of the ceramics. Such physical properties adversely affected by machining include a reduction in the ceramics strength, changes in the ceramic magnetic properties, and even changes in the electronic properties of the ceramics.

The machining of advanced ceramics has traditionally been accomplished by hard abrasives such as diamond or silicon carbide. Though this has produced surfaces that are acceptable under certain circumstances, there still remains a certain degree of surface and subsurface damage utilizing these compounds. The use of softer polishing abrasives, such as colloidal silica, for machining advanced ceramics has been examined. Colloidal silica has been shown to polish alumina, silica, and silicon.

In fact, colloidal silica has been used extensively to polish silicon chips. However, the use of colloidal silica to polish advanced ceramics tends to produce a polished advanced ceramic product with substantial phase relief. The relief is believed to be caused by the chemical dissolution of selective grains on the advanced ceramics by the colloidal silica.

2. To Prior Art

The use of colloidal silica to polished silicon surfaces, metals, glass, garnets and sapphires is disclosed in the article H. W. Gutsche and J. W. Moody, "Polishing of Sapphire with Colloidal Silica", *J. Electrical Chemical Soc.* 125, No. 1, Pages 136-138, (1978). The article discloses that colloidal silica has a chemical effect on the harder sapphire material allowing the colloidal silica to polish the sapphire. The article is silent concerning combining colloidal silica with other polishing substances to polish hardened materials.

The use of $CaCO_3$, $BaCO_3$ and MgO as mechanochemical polishing abrasives is disclosed in a report by H. Bora and R. J. Stokes, *Study of Mechanochemical Machining of Ceramics and the Effect on Thin Film Behavior*, United States Government Report N00014-80-C-0437-1 (Apr. 30, 1981). The report details the polishing of thin layers of MgO, $Al_2O_3$ and Si by various abrasives including rock salt, Calcite, Fluorite and various other abrasives including window glass. The three compounds mentioned above were discovered to be capable of mechanochemically polishing one or more of the above materials. None of the mechanochemical abrasives used were combined with colloidal silica.

The mechanochemical polishing of sapphire, silicon, and quartz crystals is disclosed by N. Yasunaga, U. Tarumi, A. Obara, "Mechanism and Application of the Mechanochemical Polishing Method Using Soft Powder" *The Science of Ceramic Machining and Surface Finishing* II, NBS special publication 562, U.S. Government Printing Office, Washington, D.C., pages 171-183 (1979). The sapphire, silicon and quartz were polished with wet and dry mechanochemical media. The mechanochemical media included $BaCO_3$, $Fe_3O_4$, $CeCO_2$, $SiO_2$, $CeO_2$, diamond and $MnO_2$. The primary focus of the article is a description of the formation of crystalline silica materials in the mixed powder abrasive during the workpiece polishing. The crystalline materials were produced by polishing the hard materials described above at high temperatures and pressures using the mixed powder. The article does not disclose the use of colloidal silica in any manner for mechanochemical polishing.

SUMMARY OF THE INVENTION

It is an object of this invention to provide an inexpensive mechanochemical polishing abrasive which is capable of polishing a hardened work piece without selectively abrading the surface particles of the hardened work piece.

It is yet another object of this invention to provide a method for polishing a hardened work piece utilizing an inexpensive mechanochemical abrasive. This invention relates generally to a mechanochemical abrasive. The mechanochemical abrasive comprises a slurry of colloidal silica containing one or more mechanical abrasives.

In a variation of this embodiment, this invention is a mechanochemical abrasive comprising a slurry of colloidal silica and a mechanical abrasive selected from one or more of the materials in the group comprising $Fe_2O_3$, $Fe_3O_4$, MgO, $BaCO_3$, $CaCO_3$, $MnO_2$, CeO, $SiO_2$, $CeO_2$, $Cr_2O_3$, and $Al_2O_3$.

In a preferred embodiment, this invention is a mechanochemical polishing abrasive comprising from about 13 to about 99.3 weight per cent of a basic slurry of colloidal silica and from about 0.7 to about 2.0 weight percent of a mechanical abrasive. The mechanical abrasive has a particle size of from about 0.1 microns to about 10 microns. The mechanical abrasive is selected from one or more of the materials in a group comprising $Fe_2O_3$, $Fe_3O_4$, MgO, $BaCO_3$, $CaCO_3$, $MnO_2$, CeO, $SiO_2$, $CeO_2$, $Cr_2O_3$, and $Al_2O_3$.

In another embodiment, this invention is a method for polishing one or more workpieces with a mechanochemical polishing abrasive. The mechanochemical polishing abrasive comprises an aqueous slurry of colloidal silica and a mechanical abrasive selected from one or more of the materials in the group comprising $Fe_2O_3$, $Fe_3O_4$, MgO, $BaCO_3$, $CaCO_3$, $MnO_2$, CeO, $SiO_2$, $CeO_2$, $Cr_2O_3$, and $Al_2O_3$. The workpiece is polished by applying the mechanochemical polishing abrasive to a workpiece and either directly or via a polishing pad and contacting the polishing means with one or more workpieces for a period of time sufficient to polish a surface of the workpiece.

DESCRIPTION OF THE PREFERRED EMBODIMENTS

The present invention relates to mechanochemical polishing abrasive and a method for polishing a workpiece utilizing the mechanochemical polishing abrasive. The mechanochemical polishing abrasive of this invention comprises a colloidal silica material combined with a mechanical abrasive.

The colloidal silica material contained in the mechanochemical polishing abrasive of this invention chemically reacts with the various surface components which make up the hardened workpieces that are polished with the mechanochemical polishing abrasive. The precise chemical reaction that occurs between the colloidal silica and the elements and molecules in the surface of the workpiece is not totally understood. However, it is believed that the colloidal silica reacts with the surface of the hardened workpiece to produce a surface material on the workpiece that is softer than the mechanical abrasive. As mentioned above, one drawback with the colloidal silica is that it appears to attack preferred grains on the surface of the hardened substrate so that a reliefed surface finish can result when the workpiece surface is chemically altered by the colloidal silica.

Colloidal silica is typically supplied in an aqueous (water-containing) slurry made up of up to 50% or more colloidal silica. One interesting feature of the colloidal silica slurry is that the colloidal silica does not settle from a slurry even after a great period of time. The colloidal silica is generally contained in an aqueous slurry, that is combined with water. However, for purposes of the polishing abrasive of this invention, the colloidal silica need not be, and in some cases, must not be in a slurry with water, but can be in a slurry with some other liquid, such as an alcohol and organic solvent or the like material. Water is not desired as a slurry of material in all cases because water can adversely react with certain hardened workpieces to produce a useless product.

The preferred colloidal silica will be an aqueous slurry of colloidal silica. The weight percent content of the colloidal silica in the aqueous slurry is not critical. However, it is preferred that the colloidal silica be present in the aqueous slurry in an amount ranging from about 15 to about 50 weight percent or greater.

Other properties of the colloidal silica slurry such as pH, particle size and the like are not absolutely critical to its usefulness in chemically reacting with the surface of a hardened workpiece. However, it is preferred that the pH of the colloidal silica slurry be greater than about seven. A colloidal silica slurry having a pH greater than about seven is a basic slurry, and has been found to react more efficiently with the surface of the materials which can be polished with the mechanochemical polishing abrasive of this invention.

The preferred aqueous slurry of colloidal silica can be any known colloidal silica slurry. Generally, colloidal silica's are stabilized at a pH of from about 8 to 14 and more commonly in a range from about 9 to 11. The preferred colloidal silica has a pH ranging from about 9.8 to 10.2 and has an average particle size of about 0.06 microns.

The mechanochemical polishing abrasive of this invention also includes a mechanical abrasive. The mechanical abrasive is generally a softer material than the material making up the workpiece. However, the mechanical abrasive is generally harder than the surface material of the workpiece resulting from the chemical reaction between the colloidal silica components of the polishing abrasive and the hardened workpiece. The purpose of the mechanical abrasive is to abrade the softer reacted materials from the surface of the hardened workpiece leaving behind a smooth workpiece surface. By abrading the softer reaction product from the surface of the hardened workpiece the mechanical abrasive continuously exposes a hardened surface to the colloidal silica which chemically reacts with the exposed surface. In this way, the selective reaction of the colloidal silica with various selective grains on the surface of the hardened workpieces can be reduced to a minimum producing a highly polished, hardened substrate surface.

The mechanical abrasive useful in the mechanochemical abrasive of this invention may be any material or combination of materials known in the art to be useful as a mechanical abrasive material. The mechanical abrasive will typically be softer, that is, not as hard as the material making up the workpiece. The mechanical abrasive material may, for example, be selected from one or more of the following compounds: $Fe_2O_3$, $Fe_3O_4$, $MgO$, $BaCO_3$, $CaCO_3$, $MnO_2$, $CeO$, $SiO_2$, $CeO_2$, $Cr_2O_3$, and $Al_2O_3$. A preferred mechanical abrasive is $Fe_2O_3$. It is also preferred that the mechanical abrasive have an average particle size of from about 0.1 microns to about 10 microns and more preferably from about 0.5 to 5.0 microns.

As previously mentioned, the mechanochemical polishing abrasive of this invention comprises a slurry of colloidal silica and one or more mechanical abrasives. The mechanochemical polishing abrasive of this invention will typically contain from about 0.1 grams of a powdered mechanical abrasive with 100 ml of colloidal silica to enough mechanical abrasive combined with colloidal silica to turn the mechanochemical polishing abrasive into a viscous slurry. The amount of mechanical abrasive necessary to turn the mechanochemical abrasive into a viscous slurry will vary depending upon the mechanical abrasive used and depending upon the silica content of the colloidal silica.

Water or other diluent materials such as alcohols, solvents, etc. may be added to the mechanical abrasive/colloidal silica mixture to reduce the viscosity of the mechanochemical abrasive. A mechanochemical abrasive with a low viscosity is easily applied to workpieces. It covers the workpieces evenly and generally has better flow and abrasive properties.

Preferably, the mechanochemical abrasive of this invention will comprise from about 0.07 to about 2.0 wt % of a powdered mechanical abrasive from about 13 to about 99.2 wt % of colloidal silica and from about 0.7 to about 85 wt % ml water. Preferably, the water is deionized water.

The mechanochemical abrasive of this invention is useful for polishing the surfaces of many different hardened workpieces. The mechanochemical polishing abrasive of this invention may be used to polish the surface of any material which is capable of chemically reacting with a colloidal silica slurry. Examples of such material include silicon (such as silicon wafers), sapphire, metals, glass, alumina, silicon nitride ($Si_3N_4$), gallium arsenide (GaAs), magnesium oxide (MgO), zirconia and other hardened ceramic and non-ceramic materials.

The mechanochemical polishing abrasive of this invention can be used to polish hardened workpieces by any polishing means known in the art for polishing hardened workpieces. The polishing can be accomplished by any polishing means including by hand using a pad and the mechanochemical polishing abrasive, or by a machine using the liquid mechanochemical polishing abrasive of this invention. It is preferred that a pad be used in conjunction with a machine to polish hardened workpieces with the polishing abrasive of this invention. The polishing abrasive is applied to the pad or the workpieces and the pad then frictionally contacts at least one surface of the abrasive covered workpieces during the polishing step. The workpiece is polished for a period of time sufficient to polish the surface of the workpiece to a desired finish.

Polishing conditions, including pressure and temperature, may affect workpiece polishing rate. However, the abrasive is effective in polishing workpieces over a wide range of pressures and temperatures. Specific pressures and temperatures are not required for the mechanochemical polishing abrasive to be effective.

Certain preferred examples of the invention will be discussed below. However, many other examples would also fall within the scope of present invention.

EXAMPLES

EXAMPLE 1

In this example Alumina ($Al_2O_3$) was polished with various abrasives including mechanical abrasives, chemical abrasives and the mechanochemical abrasive of this invention. The abrasives were evaluated for their ability to remove surface material from alumina workpieces over time.

The surface of the alumina workpieces were prepared by grinding them with 30 micron diamond particles contained on a hard polymer composite plate followed by grinding with 6 micron diamond particles on a soft polymer composite plate. After the surface of the alumina was prepared, a Knoop indent was made in the hardened workpiece with a 5 kg load, indented at a loading rate of 70 microns/sec. with a loading time of 15 seconds. Material removal rates were made by measuring the reduction in the diagonal length of the Knoop indent over time.

Both vibratory and semi-automated polishers were used. Vibratory polishing was used to minimize the mechanical contribution. The experiments were monitored for 24 hours. Semi-automated polishers were used to provide added mechanical contribution.

The polishing was conducted on a TEXMET ® polishing cloth sold by Buehler.

A summary of the polishing results for alumina workpieces is found in Table I below:

TABLE I

| Polishing Technique | Abrasive | Polishing Rate |
|---|---|---|
| | | (microns/hr) |
| Vibratory | $Fe_2O_3$ | 0.002 |
| Polishing | colloidal silica | 0.042 |
| | $Fe_2O_3$ + (colloidal silica) | 0.125 |
| | | (microns/min.) |
| Mechanical | $Fe_2O_3$ | nil |
| Rotary | colloidal silica | 0.26 |
| Polishing | ½ microns diamond | nil |
| | 3 microns diamond | 0.21 |
| | $Fe_2O_3$ + (colloidal silica) | 0.35 |

The results indicate that, with either vibratory or mechanical rotary polishing, the mechanochemical polishing abrasive of this invention comprising colloidal silica slurry in combination with the mechanical abrasive, $Fe_2O_3$, is able to polish alumina at a higher polishing rate than either colloidal silica or $Fe_2O_3$ alone. Additionally, the polishing rate for the colloidal silica/$Fe_2O_3$ abrasive is far superior to the cumulative polishing rate of the colloidal silica and the $Fe_2O_3$. (0.125 microns/hr versus 0.044 microns/hr for vibratory polishing and 0.35 microns/min. versus 0.26 microns per min. for rotary polishing).

This example clearly shows that the mechanochemical polishing abrasive of this invention unexpectedly has a superior polishing rate in comparison to colloidal silica or mechanical abrasives alone or cumulatively.

EXAMPLE II

Using the same vibratory polishing method above, Knoop indented samples of alumina, silicon nitride, and zirconia were polished using colloidal silica, various mechanical abrasives and various mechanochemical abrasives of this invention.

The mechanochemical polishing media consisted of a liter of solution made up of 20 grams of either $Al_2O_3$, $CeO_2$, $Cr_2O_3$ or $Fe_3O_2$ along with, 490 ml of a aqueous colloidal silica. The aqueous colloidal silica had a pH of about 10.0, an average particle size of about 0.05–0.07 microns, a specific gravity of 1.390 and contained 50% solids. 5 ml of deionized water was added to the mixture to complete the formula.

Vibratory polishing was used to polish the various samples for a period of 24 hours. The polishing rate for each abrasive in microns/hr was then determined. The result of the vibratory polishing of the three samples are found in Table II below:

TABLE II

| | Mechanochemical Polishing Rate (microns/hr) | | |
|---|---|---|---|
| Polishing Media | Alumina | Silicon Nitride | Zirconia |
| $Al_2O_3$ + colloidal silica | 0.045 | 0.163 | 0.173 |
| $Ce_2O_3$ + colloidal silica | 0.027 | 0.300 | 0.1875 |
| $Ce_2O_3$ | 0.006 | 0.135 | — |
| $Fe_2O_3$ + colloidal silica | 0.125 | 0.300 | 0.448 |
| $Fe_2O_3$ | 0.003 | 0.042 | 0.173 |
| $Cr_2O_3$ + colloidal silica | 0.148 | 0.188 | 0.233 |
| $Cr_2O_3$ | 0.00 | 0.058 | 0.00 |
| (CS) colloidal silica | 0.044 | — | 0.058 |

The colloidal silica used above is the same colloidal silica used in the mechanochemical polishing abrasive. No water was added to the colloidal silica before it was used for testing purposes.

A slurry was made of each of the mechanical abrasives used in the testing by adding 5 ml of deionized water to about 20 g of the powdered mechanical abrasive.

Polishing pressures and temperatures were not critical to the results but were maintained as uniform throughout the testing as possible. The polishing temperature was held at about 25° C. while the polishing pressure was kept at about 50 gm/cm$^2$.

In most cases, the mechanochemical polishing abrasive of this invention polished each material at a higher rate than the colloidal silica or the mechanical abrasive alone or cumulatively. Only the $Ce_2O_3$ plus colloidal silica, polishing alumina, showed a lower polishing rate than colloidal silica alone.

What I claim is:

1. A method for polishing a workpiece with a mechanochemical polishing abrasive comprising a slurry of colloidal silica and one or more mechanical abrasives other than silica by applying the mechanochemical polishing abrasive to a workpiece and contacting the workpiece with a polishing means for a period of time sufficient to polish at least one surface of the workpiece, said workpiece comprising a surface which has normally greater hardness than said one or more mechanical abrasives present, said workpiece surface also being interactive with colloidal silica to be softened to permit abrasion of said softened workpiece surface by said one or more mechanical abrasives.

2. The polishing method of claim 1 further characterized in that the mechanochemical polishing abrasive is applied to the polishing means.

3. The polishing method of claim 1 further characterized in that the polishing means is a mechanical polishing means utilizing a polishing pad.

4. A method for polishing a workpiece with a mechanochemical polishing abrasive comprising an aqueous slurry of colloidal silica, and a mechanical abrasive of at least one of the materials selected from the group consisting of $Fe_2O_3$, $Fe_3O_4$, $MgO$, $BaCO_3$, $CaCO_3$, $MnO_2$, $CeO$, $SiO_2$, $CeO_2$, $Cr_2O_3$, and $Al_2O_3$ by applying the mechanochemical polishing abrasive to a pad located on a mechanical polishing means and frictionally contacting the pad of the mechanical polishing means with at least one surface of the workpiece for a period of time sufficient to polish the surface of the workpiece, said surface of said workpiece having a hardness which is greater in its normal condition than the hardness of said mechanical abrasive, said surface of the workpiece being interactive with colloidal silica to be softened thereby and to be abraded by said mechanical abrasive.

5. The method of 4 in which said mechanical abrasive has a particle size of about 0.1 micron to about 10 microns.

6. The method of claim 5 in which said colloidal silica has a pH greater than about 7.0.

7. The method of claim 6 in which said polishing abrasive comprises about 13 to about 99.2 weight percent of aqueous slurry of colloidal silica, from about 0.7 to about 85 weight percent of water, and from about 0.07 to about 2.0 weight percent of said mechanical abrasive.

8. The method of claim 6 in which said mechanical abrasive has a particle size from about 0.5 micron to about 5 microns.

9. The method of claim 5 in which said mechanical abrasive is selected from the group consisting of $Al_2O_3$, $Ce_2O_3$, $Fe_2O_3$, and $Cr_2O_3$.

10. The method of claim 9 in which said workpiece defines a surface made of a material selected from the group consisting of alumina, silicon nitride, and zirconia.

11. The method of claim 1 in which said workpiece defines a surface made of a material selected from the group consisting of alumina, silicon nitride, and zirconia.

12. The method of claim 1 in which said mechanical abrasive is selected from the group consisting of $Al_2O_3$, $Ce_2O_3$, $Fe_2O_3$, and $Cr_2O_3$.

13. The method of claim 12 in which said workpiece defines a surface made of a material selected from the group consisting of alumina, silicon nitride, and zirconia.

14. The method of claim 1 in which said colloidal silica has a pH greater than about 7.0.

15. The method of claim 1 in which the particle size of said mechanochemical polishing abrasive is larger than the particle size of said colloidal silica.

16. The method of claim 4 in which the particle size of said mechanochemical polishing abrasive is larger than the particle size of said colloidal silica.

* * * * *